United States Patent [19]

Velbeck et al.

[11] Patent Number: 5,177,363
[45] Date of Patent: Jan. 5, 1993

[54] HIGH TEMPERATURE THERMOLUMINESCENT DOSIMETER AND METHOD OF MAKING AND USING SAME

[75] Inventors: Kenneth J. Velbeck, Sagamore Hills; James D. Chamberlain, Maple Heights; Riad A. Tawil, Kirtland; Nokul Panigrahi, Cleveland, all of Ohio; Marko Moscovitch, Rockville, Md.; Ramesh Tailor, Houston, Tex.

[73] Assignee: Solon Technologies, Inc., Solon, Ohio
[21] Appl. No.: 620,267
[22] Filed: Nov. 30, 1990
(Under 37 CFR 1.47)
[51] Int. Cl.$^5$ ............................................. G01T 1/11
[52] U.S. Cl. ................................. 250/337; 250/484.1
[58] Field of Search ..................... 250/484.1 A, 337

[56] References Cited

U.S. PATENT DOCUMENTS

| | | | |
|---|---|---|---|
| 3,471,699 | 10/1969 | McCall | 250/484.1 |
| 4,636,642 | 1/1987 | Simons et al. | 250/337 |
| 4,975,589 | 12/1990 | Chamberlain et al. | 250/484.1 |

FOREIGN PATENT DOCUMENTS 60-210787 10/1985 Japan ................................. 250/484.1

OTHER PUBLICATIONS

Marshall et al., "Measurement of Skin Dose from Low Energy Beta and Gamma Radiation Using Thermoluminescent Discs", Phys. Med. Biol., vol. 16, No. 3, pp. 503-510 (1971).
Charles et al., "Implementation of the IRCP Recommendation on Skin Dose Measurement Using Thermoluminescent Dosimeters", Phys. Med. Biol., vol. 23, No. 5, pp. 972-975 (1978).
Harvey et al., "Thin-Layer Thermoluminescent Dosemeters Based on High-Temperature Self-Adhesive Tape", Phys. Med. Biol., vol. 24, No. 6, pp. 1250-1257 (1979).
Lowe et al., "A New Development in Skin Dosimetry", Nuclear Instruments and Methods, vol. 169, pp. 609-612 (1980).
Yamamoto et al., "Construction of a Composite Thin-Element TLD Using and Optical-Heating Method", Health Physics, vol. 43, No. 3, pp. 383-390 (1982).
Lesz et al., "LiF Thin Layer Detectors for TL and TSEE Readable Dosemeters", Radiation Protection Dosimetry, vol. 6, Nos. 1-4, pp. 155-156 (1984).
Holzapfel et al., "Bonded Thin Layer Detector for Integrating Solid State Dosemeters", Radiation Protection Dosimetry, vol. 6, Nos. 1-4, pp. 200-202 (1984).
Dutt et al., "The Performance of a New Extremity and Skin Dosemeter", Radiation Protection Dosimetry, vol. 6, No. 1-4, pp. 257-260.
Driscoll et al., "The Response of Thermoluminescent Materials to Beta Radiation", Radiation Protection Dosimetry, vol. 9, No. 4, pp. 295-298 (1984).
Lakshmanan et al., "The Development of Thin CaSO$_4$:Dy Teflon TL Dosimeters for Beta Dosimetry in Personnel Monitoring", International Journal of Applied Radiation and Isotopes, vol. 31, pp. 107-110 (1980).
Thermoluminescence and Thermoluminescent Dosimetry, pp. 62-64 and 123, no other identifying data.
DuPont Company, Brochure entitled "Processing Guideline for Die Dispense of Pyralin Polymides".
Du Pont Company, Specification Sheets for OI-2566 Pyraline Polymides Coating, Including Materials Safety Daya.
Du Pont Company, Specification Sheets for T-9039 Thinner.
Du Pont Company, Bulletin No. GS-87-4, General Specification for Kapton Polyamide Film.
Modern Plastics Mid-Oct. Encyclopedia Issue, pp. 25, 26, 87 and 88.

Primary Examiner—Constantine Hannaher
Attorney, Agent, or Firm—Renner, Otto, Boisselle & Sklar

[57] ABSTRACT

A TLD dosimeter and method of making same, characterized by assembling a solid body of TL material on a non-luminescent substrate with a non-luminescent liquid adhesive interposed between juxtaposed parallel surfaces of the TL body and substrate, and heating the assembly to cure the liquid adhesive thereby to bond the TL body to the substrate. The liquid adhesive is a polyimide. For bonding the solid body to a film substrate such as an aromatic polyimide film, the TL body and film substrate are pressed together during heating and the heating step preferably involves baking the assembly at a high temperature.

21 Claims, 2 Drawing Sheets

HIGH TEMPERATURE THERMOLUMINESCENT DOSIMETER AND METHOD OF MAKING AND USING SAME

The invention herein described relates generally to radiation dosimetry and, more particularly, to the provision of a dosimeter wherein a solid body of thermoluminescent (TL) material is uniquely bonded to a substrate through use of a bonding agent applied as a liquid and cured under heat and pressure to securely mount the TL body to the substrate. The invention has particular application to the provision of a high temperature TL dosimeter.

BACKGROUND

Thermoluminescent dosimetry, commonly referred to as TLD, is a technique for radiation dose measurement. A thermoluminescent (TL) material after having been exposed to an incident flux of charged particles, such as beta rays, or uncharged particles, such as neutrons, or electromagnetic energy, such as gamma rays and x-rays, will emit light when heated. When the emitted light is measured as function of the temperature of the material over time, a glow curve is produced. The glow curve can be analyzed to determine the quantity of radiation to which the TL material had been exposed.

TLD systems have been developed for monitoring the exposure of personnel who work in the vicinity of radioactive materials, x-ray equipment, etc. Each person being monitored is given a badge to wear so that the badge will be exposed to the same type and dosage of radiation as is the person wearing the badge. Although different types of badges have been used, one commonly used badge consists of an outer holder that houses a TLD card insert usually containing two, three or four TL elements. The TLD card includes two aluminum plates that are secured together and have aligned holes forming respective windows for the TL elements. Sandwiched between the plates are two sheets of transparent Teflon polytetrafluoroethylene (PTFE) that encapsulate the TL elements at the windows. The TLD cards, and the holders as well, are provided with machine readable codes to enable automatic card and/or holder identification by a TLD card reader.

Periodically the TLD cards are processed through a TLD card reader to produce an exposure record for each person being monitored. In the TLD card reader, the TL elements in each card are heated and the thermoluminescence as a function of TL element temperature is measured as by using a photomultiplier tube. The photomultiplier tube response is processed electrically to provide a measurement of TL integrals and/or the glow curve. After a glow curve is determined, the TL elements typically are annealed so that they can be used again.

The individual TL elements mounted in the above or other composite dosimeters are commonly solid bodies of TL material in the form of wafers, ribbons, chips or discs. Other solid dosimeter bodies have been produced by compressing and heating a homogeneous mixture of fine-grain phosphor powder, such as LiF, and PTFE powder to a temperature above the softening temperature of PTFE (327° C.) in a mold. The result is a matrix of phosphor and PTFE which may be produced in various shapes.

Another type of composite dosimeter is described by Yamamoto et al in "Construction of a Composite Thin-Element TLD Using an Optical-Heating Method", *Health Physics*, Volume 43, No. 3, pages 383-390, September 1982. This paper describes a thin-layer dosimeter element made up of a mono-layer of phosphor granules of about 0.09 mm diameter formed on a substrate polyimide film of 11 $mg/cm^2$ thick with polyimide monomers as a binder. A thin carbon layer is coated onto the opposite side of the polyimide film to increase absorbency. A transparent Teflon film 22 $mg/cm^2$ thick covers the phosphor layer with a gap of 0.5 mm to keep out dust, moisture, sweat and the like. Four dosimeter elements are mounted on a plastic plate housed in a plate holder that is carried in a hanger.

Harvey et al, in "Thin-layer Thermoluminescent Dosimeters Based on High-Temperature Self-adhesive Tape", *Phys. Med. Biol.*, Vol. 24, No. 6, pp. 1250-1257, 1979, disclose another type of thin-layer thermoluminescent dosimeter. This dosimeter is based on a self-adhesive tape consisting of a polyimide plastic film with a silicon adhesive. Loose lithium fluoride crystals are sprinkled onto the adhesive tape and then the tape is sandwiched between glass slides under pressure and heated to 250° C. in an oven for 45 minutes to embed the crystals in the adhesive layer. Discs are then cut out with a punch to form individual dosimeters.

Simons et al in U.S. Pat. No. 4,636,642 describes yet another method of making a dosimeter element and specifically a beta dosimeter element. A TLD chip is attached to a graphite block by a Kapton XP adhesive product manufactured and sold by the Du Pont Company of Wilmington, Del. The Kapton XP adhesive product is a thin polyimide film that has a coating of perfluoroalkoxy (PFA) resin on both sides to act as a high temperature adesive and allow heat sealing of the polyimide film to the graphite block and TLD chip. The graphite block is glued to a glass slide and then a Kapton XP square is placed on top of each graphite block, followed by a TLD chip on top of the Kapton XP square. Another glass slide is then placed on top of these composites and the entire assembly is put in a covered petri dish and baked in a 400° C. oven for five minutes. After from the oven the top glass slide is immediately pressed down hard and held for one minute to compress the composite dosimeters. According to the '642 patent, the dosimeters can be annealed at 350° C. in covered petri dishes for ten minutes to remove residual thermoluminescence from previous radiation exposure.

SUMMARY OF INVENTION

The present invention provides an improved dosimeter and method for making the same. More particularly, the invention provides both a method for mounting discrete dosimeters (individual dosimeter elements) to a supporting substrate for assembly in a composite dosimeter as well as a method for making individual dosimeter elements having a laminated construction and improved performance.

The invention may be applied to extend routine TLD to 400° C. and higher, whereas many earlier dosimeter designs are limited to 300° C. The extension to higher temperatures enables annealing at higher temperatures to minimize or eliminate dependence of exposure evaluation on the thermal history of the TL element or elements in the dosimeter. Moreover, high temperature TL materials may be used in routine dosimetry. The invention may also be practiced to ruggedize thin TL-elements and further to enhance beta energy response of thin TL-elements. The invention may be applied to produce dosimeters that provide acceptable performance for ionizing radiations such as fast electrons, heavy charged particles, electromagnetic radiation and neutrons.

According to one aspect of the invention a method of fabricating a dosimeter comprises the steps of assembling a solid body of TL material on a non-luminescent substrate with a non-luminescent liquid adhesive interposed between juxtaposed parallel surfaces of the TL body and substrate, and heating the assembly to cure the liquid adhesive thereby to bond the TL body to the substrate. Preferably the liquid adhesive is a polyimide. For bonding the solid body to a film substrate such as an aromatic polyimide film, the TL body and film substrate preferably are pressed together during heating and the heating step preferably involves baking the assembly at a high temperature equal or greater than 300° C. and more preferably at a temperature equal or greater than 400° C. The pressing step includes pressing the assembly together, while being heated, preferably at a pressure of 320 psi±100 psi.

According to another aspect of the invention, a high temperature dosimeter comprises a non-luminescent substrate, a solid body of thermoluminescent material, and a non-luminescent polyimide adhesive bonding the TL body to the substrate at juxtaposed parallel surfaces of the body and substrate. The substrate preferably is a polyimide film and the body has a bare outer surface. The dosimeter may further comprise a pair of support plates secured together to form a card structure with the polyimide film sandwiched therebetween, the support plates including at least one aperture defining a window at which the solid body is located.

According to still another aspect of the invention, a method of using a dosimeter wherein the dosimeter includes a support plate having an aperture, a non-luminescent polyimide film secured to the support plate and spanning the aperture, and a solid body of TL material bonded by a non-luminescent polyimide adhesive to the polyimide film at the aperture, comprises the steps of exposing the dosimeter to radiation, heating the solid body of TL material bonded to the polyimide film to cause emission of scintillation light, and detecting the scintillation light emitted by the TL material.

The foregoing and other features of the invention are hereinafter fully described and particularly pointed out in the claims, the following description and the annexed drawings setting forth in detail a certain illustrative and preferred embodiment of the invention, this being indicative, however, of but a few of the various ways in which the principles of the invention may be employed.

DETAILED DESCRIPTION

Figure 1:
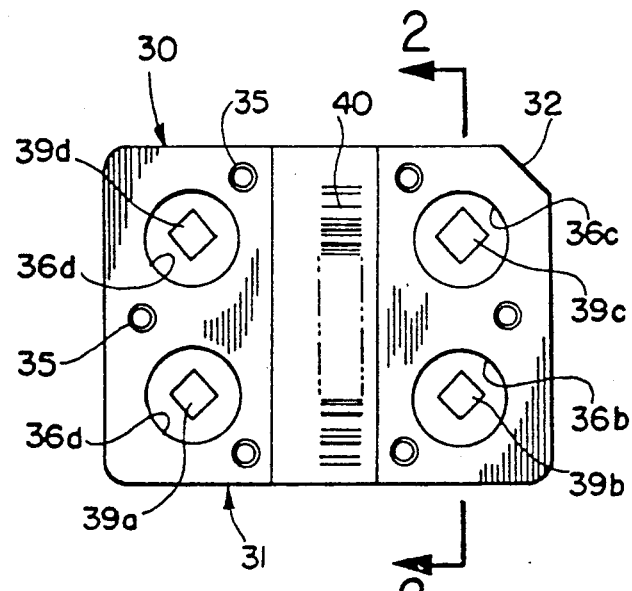
FIG. 1 is a top plan view of an exemplary TLD card.
Figure 2:
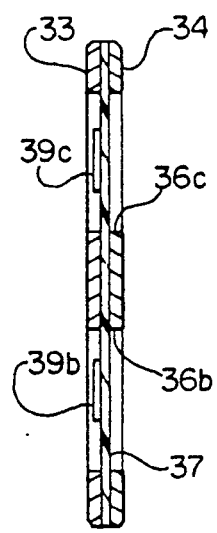
FIG. 2 is a sectional view through the TLD card, taken along the lines 2—2 of FIG. 1.
Figure 3:
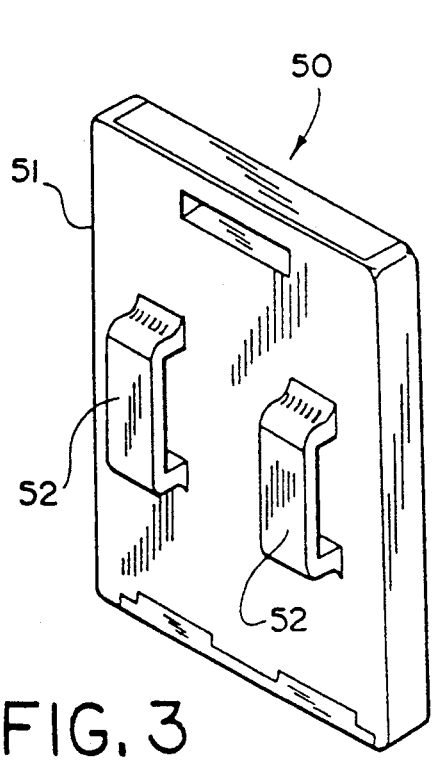
FIG. 3 is an isometric view of a TLD card holder, looking at the back side of the holder.
Figure 4:
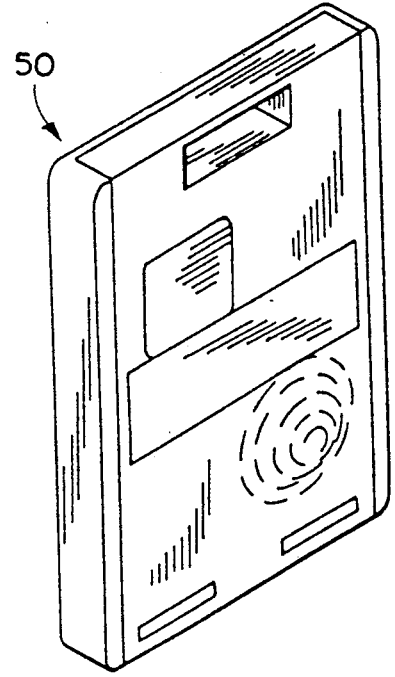
FIG. 4 is an isometric view of a TLD card holder, looking at the front side of the holder.

Referring now in detail to the drawings, a preferred embodiment of composite dosimeter according to the present invention generally comprises a TLD card indicated generally at 30 in FIGS. 1 and 2 and a TLD card holder indicated generally at 50 in FIGS. 3 and 4.

As seen in FIGS. 1 and 2, the TLD card 30 includes a relatively rigid card body of rectangular shape except for the provision of a beveled orientation identification corner 32. The card body 31 consists of two relatively rigid plates 33 and 34 of essentially non-luminescent material. A suitable material is aluminum and the two aluminum plates 33 and 34 are secured together by rivets 35 to form a laminated card structure.

The plates 33 and 34 have aligned holes forming four windows 36a–d which are arranged in a rectangular pattern at respective quadrants defined by major and minor axes of the card body 31. Sandwiched between the plates 33 and 34 is a mounting substrate formed by a sheet 37 of essentially non-luminescent material which also is essentially transparent and has high heat and radiation resistance. A preferred material is a polyimide film and, more specifically, a Kapton 100HN aromatic polyimide film sold by Du Pont Company of Wilmington, Del. Kapton 100HN is a 1 mil thick aromatic polyimide film based on a polycondensation reaction between pyromellitic dianhydride and 4,4'-diaminodiphenyl ether. Kapton HN film is available in thicknesses of 0.3, 0.5, 1, 2, 3, and 5 mil, although a 1 mil thick film is preferred.

TL elements 39a–d are mounted to the sheet 37 at respective windows 36a–d. The TL elements are mounted by means of a high temperature organic adhesive material in the manner discussed below. The thermoluminescent materials of the TL elements 39a–d may be selected to suit a particular application such as detection of one or more different types of radiation. The number of TL elements may be varied as desired. The TLD card also carries a machine readable code 40 extending along the minor axis of the card between the furthest spaced pairs of the windows.

In FIGS. 3 and 4, the holder 50 adapted to contain the illustrated TLD card 30 can be seen to have a rectangular housing 51. The housing 51 has on its back side a pair of laterally spaced apart loops 52 and 53. The loops 52 and 53 provide a convenient means for attachment of clip devices (not shown) or the like which permit wearing of the dosimeter like a badge, as is customary. For further details of the holder 50, reference may be had to copending application Ser. No. 07/222,949, filed on Jul. 22, 1988 and entitled "Thermoluminescent Dosimeter With Improved Card Holder" now U.S. Pat. No. 4,975,589 dated Dec. 4, 1990. As therein discussed, the holder may be tamper-resistant and may include various filters to provide desired filtration for the TL elements to suit the particular application of the dosimeter.

Figure 5:
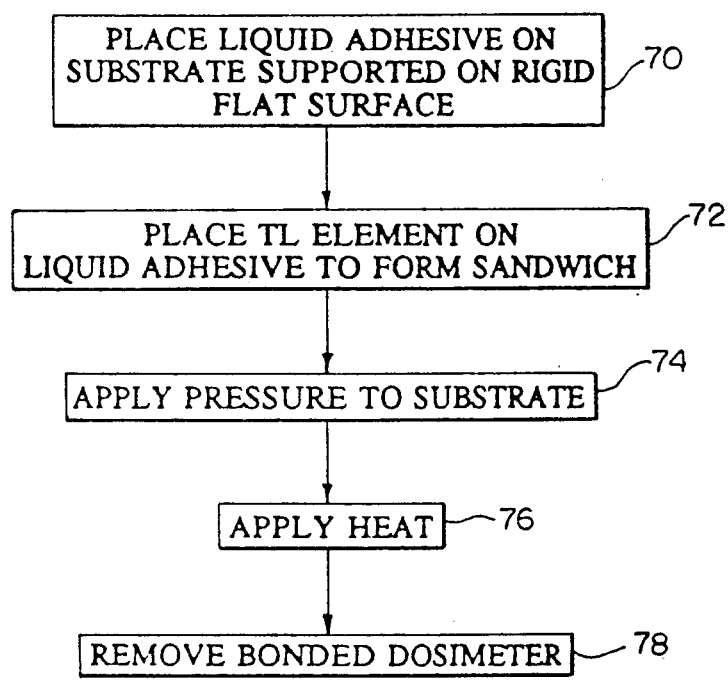
FIG. 5 is a flow diagram indicating a sequence for manufacturing a dosimeter according to the invention.

Referring now to FIG. 5, a preferred method for bonding a TL element to a polyimide film substrate is diagramatically illustrated. In accordance with the invention, bonding is effected by a liquid adhesive and preferably an organic adhesive which after cure has high heat and radiation resistance, is essentially transparent and is essentially non-luminescent alone or when used on the supporting substrate for the TL element, e.g., the sheet 37. The preferred liquid adhesive is a polyimide and, more specifically, a Pyralin polyimide sold by Du Pont Company of Wilmington, Del. Pyralin polyimides have been used as a semiconductor coating material to provide alpha protection, stress protection, corrosion protection and mechanical protection by dispensing on dies mounted on and bonded to lead frames or in packages. In present invention, the Pyralin polyimide is used as a liquid adhesive for bonding the TL elements to the Kapton polyimide film substrate 37. The Pyralin polyimide may be thinned with a T-9039 thinner available from the Du Pont Company; however, the liquid adhesive preferably is an unthinned Pyralin 2566 polyimide. Other Pyralin polyimides may be used including by way of further example Pyralin PI-2555 and PI-2578D polyimides. The Pyralin polyimides are based on n-methylpyrrolidone and specifications for Pyralin PI-2566 polyimide coating material can be found in Du Pont Products Literature Bulletin No. PC-21.

Initially, at block 70, unthinned Pyralin 2566 polyimide is placed on Kapton HN film after the Kapton HN film preferably has been cleaned with a suitable cleaning/degreasing agent such as isopropanol. The Pyralin 2566 may be placed on the Kapton film by a suitable dispenser such as, for example, a hypodermic syringe or a metered dispensing device. For a TLD element measuring ⅛" by ⅛", a single drop of the Pyralin 2566 measuring about 1/32" in diameter has been found to be a preferred amount.

If too little liquid adhesive is used, undesirable gaps in the adhesive may form between the TL element and the substrate which weakens the bond and also may degrade the performance of the dosimeter. On the other hand, too much liquid adhesive may make the fabrication process more difficult by making it more difficult to precisely locate the TL element at a precise location on the substrate. Also, the excess liquid adhesive may partly or completely cover the otherwise bare surface of the TL element opposite the substrate. During the placement of the liquid adhesive on the Kapton film, the Kapton film preferably is supported on a rigid flat surface of a clamp plate preferably of a material to which the Pyralin 2566 will not bond tightly such as, for example, a glass plate or slide.

At block 72, the TL element is placed onto the drop of liquid adhesive. The TL element for purposes of the present invention is a solid body of TL material as opposed to loose TL powder or granules. The TL element may be in the form of a ribbon, wafer or chip of TL material and, as above indicated, may measure ⅛" by ⅛". The thickness of the solid TL element or body may vary upon application with exemplary thicknesses ranging from 0.0036 inch to 0.035 inch. Exemplary TLD materials available in the form of ribbons, chips or discs are available from Solon Technologies, Inc. (formerly The Harshaw Chemical Company) of Solon, Ohio under product designations TLD-100 (LiF), TLD-200 ($CaF_2$:Dy), TLD-400 ($CaF_2$:Mn), TLD-600 ($^6$LiF), TLD-700 ($^7$LiF), TLD-800 ($Li_2B_4O_7$:Mn) and TLD-900 ($CaSO_4$:Dy). The TL element may be placed onto the drop of liquid adhesive by using a suitable device such as, for example, a vacuum pick.

At block 74, a top clamp plate is placed atop the TL body to form a sandwich with a rigid flat surface thereof engaging the TL body. Like the bottom clamp plate the top clamp plate preferably is of a material to which the Pyralin 2566 will not bond tightly such as, for example, a glass plate. Clamping pressure then is applied to the sandwich to apply uniform, unidirectional force to the TL body and the Kapton film. This may be accomplished by placing a weight onto the top clamping plate directly over the TL body or using a spring to apply clamping pressure. When thusly weighted the TL body and Kapton film will be squeezed tightly together with only a thin layer of Pyralin 2566 interposed between juxtaposed parallel surfaces of the TL body and Kapton film.

At block 76, the weighted sandwich assembly is placed into an oven preheated to 400° C. and baked for three minutes to cure the Pyralin 2566 and bond the TL body to the Kapton film. After three minutes, at block 78, the sandwich assembly is removed from the oven after which the weight is removed and the clamping plates separated to remove the Kapton film to which the TL body is securely bonded.

The aforedescribed bonding technique provides an excellent bond between the TL body and the Kapton film which is free from air pockets and which can be subjected to repeated heating cycles in excess of 500 and temperatures up to 400° C. and possibly as high as 450° C. without bond failure or incomplete glow curve readouts.

The foregoing method of the invention has been described in relation to the mounting of a single solid body of TL material to a polyimide film substrate. As will be appreciated by those skilled in the art, various manual and automatic systems may be devised to simultaneously mount, for example, a plurality of TL bodies to a Kapton film or other substrate. For example, multiple sets of four TL bodies may be mounted in a predetermined pattern to a polyimide film substrate. The substrate may then later be cut to form individual sheets for mounting in respective cards with each sheet having mounted thereto a set of dosimeters at locations which align with the windows in the aluminum plates of the TLD card.

The amount of clamping pressure applied to the TL body and the Kapton film substrate while being heated has been found to impact the ruggedness of the bond formed therebetween. The clamping pressure should be greater than 50 psi, more preferably greater than 100 psi, still more preferably greater than 200 psi and most preferably is greater than 220 psi. On the other hand, the pressure should not be so high as to damage the TL body or the substrate or cause too much of the liquid adhesive adhesive to be extruded from between the chip and substrate. Therefore, the applied clamping pressure should normally be below 500 psi and more preferably below 420 psi. Hence, a preferred clamping pressure for practicing the above described preferred method is between 220 and 420 psi with a most preferred pressure being about 320 psi.

As for the curing temperature, the temperature should be greater than 300° C., more preferably greater than 350° C. and more preferably about 400° C. A preheat at 100° C. for two to three minutes may be employed if desired. Temperatures higher than 400° C. may be used but the temperature should not be so high as to negatively impact the mechanical properties of the substrate or bonding properties of the liquid adhesive. Temperatures lower than 300° C. may also be used, but at the cost of a less rugged bond. Also, the adhesive should normally be cured to a temperature at least equal the maximum use temperature of the dosimeter. It is best to heat at high temperature to solidify the Pyralin polyimide before too much is squeezed out from between the TL body and substrate.

Although it is preferred that the sandwich be placed in an oven for curing of the liquid adhesive, other heating techniques could be employed. For example, an infrared lamp may be employed to heat the sandwich. Also, lower temperatures may be used as well as lower pressures, although it has been found that high pressure and rapid heating at high temperature promotes a better bond capable of withstanding the physical rigors to which the dosimeter may be exposed during use and to provide a dosimeter that can be reread in excess of 500 times.

A dosimeter made according to the method of the invention may be exposed to radiation of interest for radiation dose measurement. After exposure, the dosimeter may be read out utilizing a TLD reader such as the Model 8800 TLD reader sold by Solon Technologies, Inc. of Solon, Ohio. The Model 8800 reader may be adapted to provide for temperatures up to 450° C. This reader utilizes a non-contact heating technique based on a stream of hot nitrogen gas flowing over the dosimeter elements. Gas flow normally will be incident upon the substrate while light is read from the bare side of the TL element.

By way of further example, the invention may be applied to mount thin solid bodies of TL material to a zero or low sensitivity substrate of greater thickness to provide a ruggedized thin element laminated dosimeter. Preferably the substrate has a coefficient of thermal expansion close to that of the thin solid body to prevent or minimize fracturing of the thin solid body of TL material during heat cycling. By way of a more specific example, a beta dosimeter may be obtained by bonding a thin solid body of LiF-TLD material ($\leq 0.0036$ inch and $\frac{1}{8}'' \times \frac{1}{8}''$ square) to an inert LiF substrate of greater thickness (for example, 0.011 inch thick and 4.5 mm in diameter) using Pyralin 2566 as the liquid adhesive. It has been found that when bonding the solid body of TL material to the LiF substrate and presumably other rigid thick substrates (in contrast to flexible film substrates like 1 mil Kapton film), pressure need not be applied to the sandwich. Also, the sandwich consisting of the thin solid body of LiF-TLD material and the inert LiF substrate preferably is more gradually heated to effect a slower cure of the Pyralin polyimide as in accordance with the recommended cure schedule of 60 minutes at 100° C., then 30 minutes at 200° C. and then 60 minutes at 250°–300° C.

Various benefits are obtained by providing a TLD dosimeter having high temperature capability, for example, enabling the use of high temperature TLD materials such as CaF$_2$:Mn (TLD-400) and CaSO$_4$:Dy (TLD-900), and enabling annealing that minimizes or eliminates the dependence of exposure evaluation on thermal history of the TL elements. In the field of neutron dosimetry it is an established fact that the high residuals from neutron exposures can be substantially reduced by heating and/or annealing a TLD-600 ($^6$LiF) card at temperatures of around 400° C. Also, due to the fact that the TLD chip is bare in the direction of radiation incidence, beta dosimetry capability may be enhanced both in its response to lower beta energies that can be detected, as well as lowering the value of minimum detectability. Similar benefits are extended to include alpha particles, protons and other heavy particles.

What is claimed is:

1. A method of fabricating a dosimeter comprising the steps of:

(a) assembling a solid body of TL material on a non-luminescent substrate with a non-luminescent liquid adhesive interposed between juxtaposed parallel surfaces of the TL body and substrate, and
   (b) heating the assembly to cure the liquid adhesive thereby to bond the TL body to the substrate.

2. The method of claim 1, wherein said liquid adhesive is a polyimide.

3. The method of claim 2, wherein said substrate is a polyimide film, and further comprising the step of pressing the TL body and film substrate together.

4. The method of claim 3, wherein said heating step includes baking the assembly at a temperature equal or greater than 300° C.

5. The method of claim 3, wherein said heating step includes baking the assembly at a temperature equal or greater than 400° C.

6. The method of claim 3, wherein said heating step includes baking the assembly at about 400° C. for about three minutes.

7. The method of claim 3, wherein said pressing step includes pressing the assembly together, while being heated, at a pressure equal or greater than 50 psi.

8. The method of claim 3, wherein said pressing step includes pressing the assembly together, while being heated, at a pressure equal or greater than 100 psi.

9. The method of claim 3, wherein said pressing step includes pressing the assembly together, while being heated, at a pressure equal or greater than 200 psi.

10. The method of claim 3, wherein said pressing step includes pressing the assembly together, while being heated, at a pressure of 320 psi ± 100 psi.

11. A dosimeter made in accordance with the method of claim 3.

12. The method of claim 1, wherein said TL body is a flat body $\frac{1}{8}$ inch × $\frac{1}{8}$ inch square, and said assembling step includes placing a drop of the liquid adhesive 1/32" in diameter onto the substrate or TL body and then bringing the TL body and substrate into juxtaposition.

13. The method of claim 1, wherein said assembling step includes placing a drop of the liquid adhesive onto the substrate or TL body and then bringing the TL body and substrate into juxtaposition.

14. A high temperature dosimeter comprising a non-luminescent substrate, a solid body of thermoluminescent material, and a non-luminescent polyimide adhesive bonding said TL body to said substrate at juxtaposed parallel surfaces of said body and substrate.

15. The high temperature dosimeter of claim 14, wherein said substrate is a polyimide film.

16. The high temperature dosimeter of claim 15, wherein said dosimeter further comprises a pair of support plates secured together to form a card structure with the polyimide film sandwiched therebetween, and said support plates including at least one aperture defining a window at which said solid body is located.

17. The high temperature dosimeter of claim 14, wherein said body has a bare outer surface.

18. The high temperature dosimeter of claim 14, wherein the temperature of the main TL glow peak of said TL material is greater than 200° C.

19. The high temperature dosimeter of claim 18, wherein said TL material is selected from a group consisting of calcium fluoride manganese (CaF$_2$:Mn) or calcium sulphate dysprosium (CaSO$_4$:Dy).

20. The high temperature dosimeter of claim 14, wherein the adhesive bond between said TL body and substrate is capable of withstanding at least 500 reheats at a temperature of about 400° C.

21. A method of using a dosimeter wherein the dosimeter includes a support plate having an aperture, a non-luminescent polyimide film secured to the support plate and spanning the aperture, and a solid body of TL material bonded by a non-luminescent polyimide adhesive to the polyimide film at the aperture, comprising the steps of
  exposing the dosimeter to radiation,
  heating the solid body of TL material bonded to the polyimide film to cause emission of scintillation light, and
  detecting the scintillation light emitted by the TL material.

* * * * *